(12) United States Patent
Gamer et al.

(10) Patent No.: US 10,114,356 B2
(45) Date of Patent: Oct. 30, 2018

(54) METHOD AND APPARATUS FOR CONTROLLING A PHYSICAL UNIT IN AN AUTOMATION SYSTEM

(71) Applicant: ABB TECHNOLOGY AG, Zurich (CH)

(72) Inventors: Thomas Gamer, Bruehl (DE); Thijmen De Gooijer, Vasteras (SE)

(73) Assignee: ABB Schweiz AG, Baden (CH)

( * ) Notice: Subject to any disclaimer, the term of this patent is extended or adjusted under 35 U.S.C. 154(b) by 302 days.

(21) Appl. No.: 14/873,215

(22) Filed: Oct. 2, 2015

(65) Prior Publication Data

US 2016/0026166 A1    Jan. 28, 2016

Related U.S. Application Data

(63) Continuation of application No. PCT/EP2014/000877, filed on Apr. 2, 2014.

(30) Foreign Application Priority Data

Apr. 4, 2013  (EP) .................................... 13001712

(51) Int. Cl.
| | |
|---|---|
| *G05B 9/02* | (2006.01) |
| *G06F 11/08* | (2006.01) |
| *G05B 19/042* | (2006.01) |
| *G05B 9/03* | (2006.01) |
| *G06F 11/18* | (2006.01) |

(52) U.S. Cl.
CPC ........... *G05B 19/0428* (2013.01); *G05B 9/03* (2013.01); *G06F 11/183* (2013.01); *G05B 2219/24024* (2013.01)

(58) Field of Classification Search
CPC ....................................................... G05B 9/02
USPC .................................................... 700/81
See application file for complete search history.

(56) References Cited

U.S. PATENT DOCUMENTS

| | | | | |
|---|---|---|---|---|
| 3,593,307 A | * | 7/1971 | Gouge, Jr. ............... | G05B 9/03 700/81 |
| 3,805,235 A | * | 4/1974 | Foster ................ | G01R 19/0038 244/194 |
| 3,895,223 A | * | 7/1975 | Neuner .................. | G21C 17/12 714/820 |

(Continued)

FOREIGN PATENT DOCUMENTS

| | | |
|---|---|---|
| CN | 103186129 A | 7/2013 |
| CN | 103399546 A | 11/2013 |

(Continued)

*Primary Examiner* — Suresh Suryawanshi
(74) *Attorney, Agent, or Firm* — Leydig, Voit & Mayer, Ltd.

(57) ABSTRACT

A method for controlling a physical unit, involving: cyclically generating a plurality of controlling outputs, wherein the plurality of controlling outputs is provided in a redundant manner; applying a selected one of the controlling outputs to the physical unit; checking if at least the selected controlling output is correct; and selecting one of the control units whose controlling output was checked as correct to apply its controlling output to the physical unit (2) in a subsequent cycle, wherein the applying the selected one of the controlling outputs to the physical unit is performed before or during the step of checking.

16 Claims, 2 Drawing Sheets

(56) References Cited

U.S. PATENT DOCUMENTS

| | | | | |
|---|---|---|---|---|
| 4,517,639 A * | 5/1985 | Ferrell | ............... | G06F 11/187 244/194 |
| 6,850,807 B2 * | 2/2005 | Tahira | ............... | G05B 9/03 700/19 |
| 7,120,820 B2 * | 10/2006 | Lehmann | ............... | G05B 19/0421 714/11 |
| 7,134,104 B2 * | 11/2006 | Goodnow | ............... | G06F 17/5045 716/103 |
| 7,512,727 B2 * | 3/2009 | Kreb | ............... | G05B 19/0423 710/1 |
| 7,984,878 B2 * | 7/2011 | Hirvonen | ............... | B64C 13/42 244/194 |
| 9,491,228 B2 * | 11/2016 | Sasaki | ............... | G06F 11/182 |
| 2004/0199817 A1 | 10/2004 | Butcher | | |
| 2006/0080678 A1 | 4/2006 | Bailey et al. | | |
| 2010/0205474 A1 | 8/2010 | Stich et al. | | |
| 2013/0060526 A1 | 3/2013 | Geiger et al. | | |
| 2013/0173024 A1 | 7/2013 | Pettigrew et al. | | |

FOREIGN PATENT DOCUMENTS

| | | |
|---|---|---|
| CN | 103699003 A | 4/2014 |
| DE | 19514096 A1 | 10/1996 |
| DE | 19814096 A1 | 10/1999 |
| EP | 2157487 A2 | 2/2010 |
| WO | WO 2007140122 A1 | 12/2007 |
| WO | WO 2009030363 A1 | 3/2009 |
| WO | WO 2011120490 A1 | 10/2011 |

* cited by examiner

METHOD AND APPARATUS FOR CONTROLLING A PHYSICAL UNIT IN AN AUTOMATION SYSTEM

CROSS-REFERENCE TO RELATED APPLICATIONS

This application is a continuing application based on International Application No. PCT/EP2014/000877, filed on Apr. 2, 2014, and claims benefit to European Patent Application No. 13 001 712.2, filed on Apr. 4, 2013. The International Application was published in English on Oct. 9, 2014, as WO 2014/161660 A1 under PCT Article 21(2).

FIELD

The present invention relates to automation systems including redundant automation controllers to allow high availability and quick response time.

RELATED ART

Automation units for controlling critical parts of a technical system are required to be highly available and must therefore provide redundant solutions. In case one or more of the automation units fail, their redundant counterparts shall take their place to ensure continuous and safe operation of the technical system.

Common redundant solutions provide redundancy schemes, such as M-out-of-N redundancy or stand-by redundancy, which allow a switchover from a failing part to a redundant counterpart in a very short or even zero time.

Many technical systems, however, are capable to tolerate a very short duration in which outputs of the control unit might be corrupted or not updated due to a failure. In addition, safety-critical systems may provide additional error-correcting logic in the actuators, so that, for a short duration, outputs of the automation unit sent to the actuators are allowed to be corrupted or not updated due to a failure. As an example, a controller unit for controlling a breaker module in a train may not fail or deliver corrupted outputs for more than a few control cycles because otherwise damages may occur. Consequently, there are systems in which the response of the control unit is more critical than the output of a failure pattern to the parts of the technical system that are to be controlled. This pattern introduces additional delay into the control process by collecting all outputs and performing the voting. Existing mechanisms introduce delay into the process itself. However, the above solutions are designed to firstly prove the correctness of the output of the redundant units before the correct output is forwarded to the respective part of the technical system.

Document WO 2009/030 363 is generally related to redundant controllers and applications.

Document WO 2007/140 122 discloses an apparatus comprising a circuitry to compare data corresponding to at least two redundant accesses with an input/output device so as to determine whether an error associated with either of the at least two redundant accesses has occurred.

Document Armoush, A. et al., "Recovery Block with Backup Voting: A New Pattern with Extended Representation for Safety Critical Embedded Systems", Journal of Software Engineering and Applications, Volume 2, No. 1, pp. 232-237, December 2008, also applies voting subsequently to the execution of the replicas. In that pattern however, all replicas perform an acceptance test subsequently to replica execution. If the acceptance test fails, the next replica is executed together with its acceptance test. Only if all replicas and acceptance tests fail, voting is applied on all the buffered outputs which have failed to pass the acceptance test.

In document A. Avizienis, "The N-Version Approach to Fault-Tolerant Software," IEEE Transactions on Software Engineering, Vol. 11, No. 12, pp. 1491-1501, December 1985, discloses a software-based redundancy scheme. The scheme is based on N replicas that are executed in parallel and are each developed independently by a different team in order to ensure software heterogeneity. In addition, a voter subsequently performs error detection and decides on the correct output. This output is then sent to the actuator or subsequent control part. This scheme can also easily be implemented in hardware and is then called N-Modular Redundancy—the most prominent instance being Triple Modular Redundancy (TMR). With N-Modular Redundancy, N controllers are used each executing a replica. The subsequent voting can be performed software- or hardware-based.

Similar redundancy schemes are frequently mentioned, such as in Armoush, A., "Design Patterns for Safety-Critical Embedded Systems," RWTH Aachen University, 2010.

Document US 2006/080 678 describes redundancy and majority voting with the goal of making an application tolerant to attacks.

Document US 2004/199 817 is related to running a plurality of programs on a plurality of computers and applying a voting process.

SUMMARY

An aspect of the invention provides a method for controlling a physical unit, the method comprising: cyclically generating a plurality of controlling outputs, wherein the plurality of controlling outputs is provided in a redundant manner; applying a selected controlling output of the controlling outputs to the physical unit; checking if at least the selected controlling output is correct; and selecting a selected control unit of the control units whose controlling output was checked as correct to apply its controlling output to the physical unit in a subsequent cycle, wherein the applying is performed before or during the checking.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
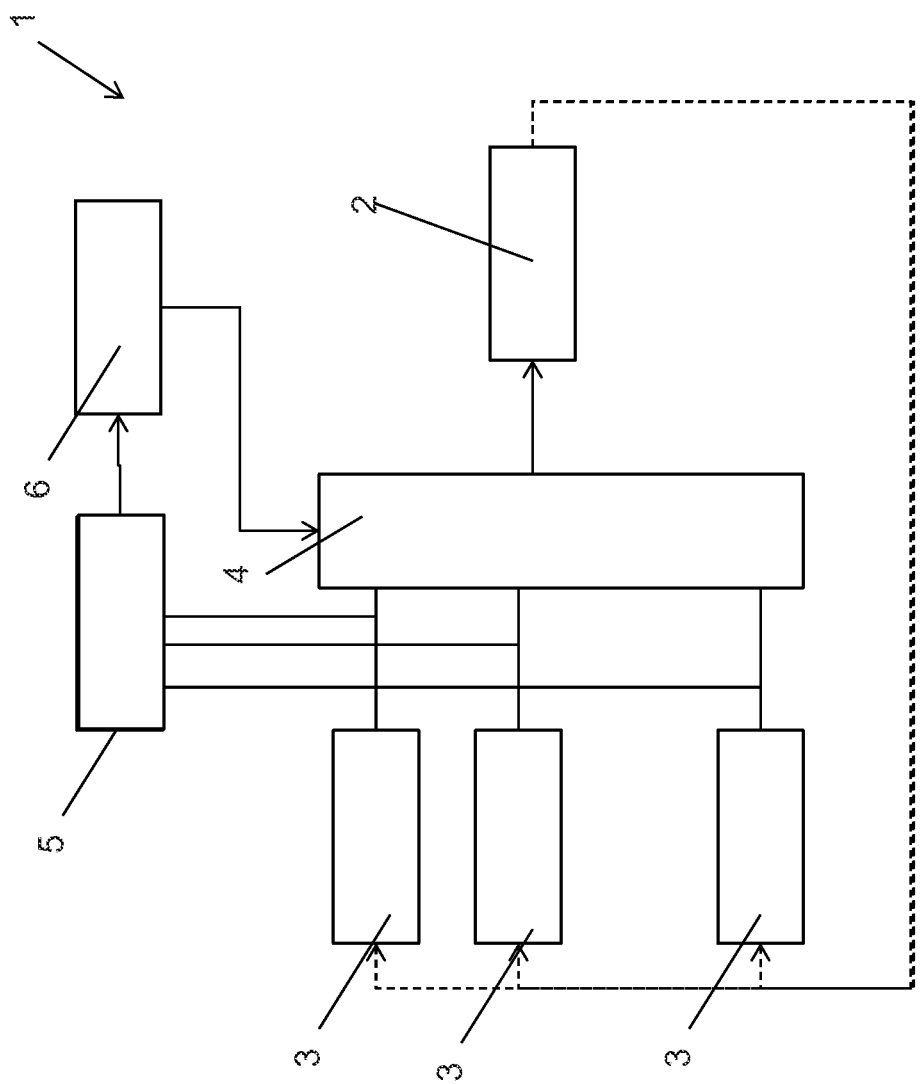
FIG. 1 shows an automation system with a plurality of redundant control units and a monitoring system, which provides for high availability and very short response time.

An aspect of the present invention provides an improved method and apparatus for controlling a technical system having a high availability due to redundancy and allowing for a very short response time. This is one way to put it, the other would be to say that no additional delay is introduced into the critical parts of the process while keeping high availability.

According to a first aspect, a method for controlling a physical unit is provided, comprising the steps of:
- cyclically generating a plurality of controlling outputs, wherein the plurality of controlling outputs is provided in a redundant manner;
- applying a selected one of the controlling outputs to the physical unit;
- checking if at least the selected controlling output is correct; and
- selecting one of the control units which had its output checked as correct to be the one applying its controlling output to the physical unit in a subsequent cycle, wherein the step of applying the selected one of the controlling outputs to the physical unit is performed before or during the step of checking.

Typically, redundancy schemes that offer high availability introduce a delay to the control application For instance, high availability as well as error detection capabilities are achieved by not directly applying the output of the control unit used to the physical unit. Instead, all outputs of the control units are sent to a voter unit. The voter unit then applies a specific voting algorithm, e. g. plurality, majority, or likelihood voting, and selects the correct output among all outputs. Thereby, control units that have delivered an incorrect output can be detected and failure recovery can be initiated for those parts. Moreover, the control application does not deliver corrupted outputs, not even in case a control unit fails.

The disadvantage of this redundancy scheme is that collecting the outputs of the control units and performing a voting algorithm introduces additional delay to the process control, i. e., the outputs are delayed in comparison to a non-redundant system. Amongst others, this delay is mainly caused by the time synchronization between the redundant control units, the communication delay for collecting all the outputs of the control units and the execution time for performing the actual voting.

One basic idea of the above method is to provide a control scheme in which the output of a control unit selected out of a plurality of control units is forwarded to the physical unit to be controlled before a correctness test is executed. In case the selected control unit has generated an invalid output, the control unit is then replaced by another control unit, e. g. before the next controlling cycle. Redundancy is achieved by a plurality of substantially identical control units, so that the availability of the overall automation system is ensured.

Forwarding the output of one control unit to the physical unit without prior checking of the correctness of the respective output allows for a propagation delay between the output of the control unit and the physical unit to be minimized, so that a fast response automation system can be established.

This scheme may be called downstream voting and may be applied where performance is an important aspect and redundancy should not introduce additional delay to the normal control process. The main characteristic of this redundancy system is that it introduces minimal delay to the control application but still offers error detection and high availability to the application.

A benefit of the downstream voting is the provision of a clearly defined switchover process, i. e. even in case of a complete failure of the primary control unit it is guaranteed that an operational control unit takes over in the next execution cycle. Moreover, there is no need to perform a complex switchover during the current controlling cycle in case the primary control unit fails.

Such a method provides a new redundancy scheme which is well suited for applications that tolerate few corrupted outputs. In addition, the proposed control scheme shows only low complexity in case of a failure. Actions in case of a failure are thus easy to understand and predict. This significantly simplifies debugging and maintenance. In a safety-critical environment, the above control scheme can provide high availability without introducing additional delay to the control process and thereby avoid safety shutdowns.

Furthermore, the step of checking may be performed e.g. as a plurality, majority or likelihood voting.

It may be provided that in the step of checking it is checked which of the controlling outputs are correct.

Moreover, the step of selecting may be performed using:
- a priority scheme;
- a random scheme; or
- a scheme wherein a number of changes of the selected controlling output is minimized.

If the controlling outputs are generated successively, the one of the controlling outputs that was checked as correct in the previous cycle and is generated first within one cycle may be selected.

It may be provided that the respective controlling output is checked as incorrect if a predetermined default value is recognized in one or more of the controlling outputs.

According to a further aspect, an apparatus for selecting one of a number of control units to be used for controlling a physical system is provided, wherein the number of control units redundantly provides controlling outputs cyclically, comprising:
a voting unit which is configured:
- to allow a previously selected control unit to apply its controlling output to the physical system;
- to check if at least a previously selected controlling output is correct;
- to select one of the controlling outputs checked as correct;
- to provide the selected one of the control units to apply its output to the physical unit in a subsequent cycle, wherein the voting unit is further configured to allow the previously selected controlling output to be applied to the physical system before or during it is checked if the previously selected controlling output is correct.

According to a further aspect, an automation system is provided, comprising:
- a number of control units for generating redundant controlling outputs;
- the above apparatus; and
- a physical system.

Furthermore, a multiplexer may be provided for selecting one of the controlling outputs of the control units to be applied to the physical system.

According to a further aspect, a general-purpose digital computer is provided which is programmed to perform the steps of the above method. According to a further aspect, a computer program product is provided which, when carried out on a computer, performs the steps of the above method.

Figure 2:
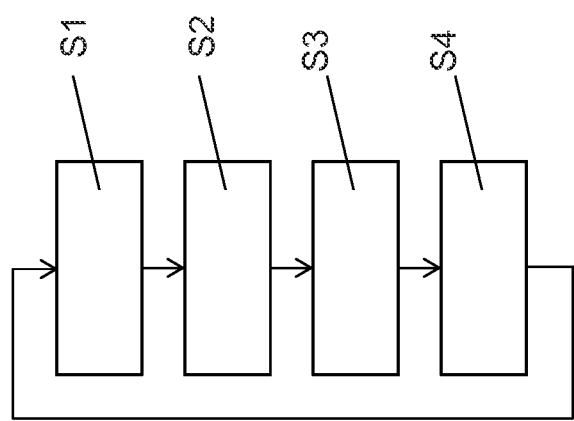
FIG. 2 shows a flow chart illustrating the method for controlling the technical unit, thereby providing redundancy and short response times.

The method for controlling a physical unit 2 in an automation system 1 is described in detail in the system of FIG. 1 and the flow diagram of FIG. 2.

FIG. 1 shows a block diagram of an automation system 1 having a physical unit 2 to be controlled. The physical unit 2 may be an actuator, any kind of technical system or the like and needs to receive a controlling signal and/or controlling data generated by one of a number of control units 3. The control units 3 are provided as a number of identical copies, so that a redundant control scheme can be provided, and may contain any kind of control circuit.

The outputs of the number of control units 3 are fed to a multiplexer 4 which provides one of the output controlling signals and/or controlling data (controlling output) of one of the control units 3 to the physical unit 2.

Furthermore, a protected memory 5 is provided. All output controlling signals and/or control data of the number of control units 3 are buffered in the protected memory 5. The output information, e.g. the controlling signal or controlling data (controlling output), can simply be tapped directly from the outputs of the control units 3 and stored in the protected memory 5 or it can be provided that the control unit 3 initially sends the output controlling signal or controlling data to the physical unit 2 via the multiplexer 4 and subsequently to the protected memory 5. This guarantees that the actual control process is not affected by processes related to storing the output information in the protected memory 5.

A voting unit 6 is provided which is coupled with the protected memory 5. The voting unit 6 is configured to perform a voting process based on information buffered in the protected memory 5. The result of the voting algorithm is a selection of one of the control units 3 which is detected as being fully operational in order to provide its output to the physical unit 2. A respective switch information S is provided to the multiplexer 4 by the voting unit 6.

The voting algorithm that is actually applied can make use of plurality, majority or likelihood voting, as known in the art. The voting unit 6 selects one control unit 3 whose output is forwarded to the physical unit 2 via the multiplexer 4 according to a switching scheme. The switching scheme can indicate, e.g. that the control unit 3 to be selected is the same as the previous control unit 3 as long as the respective control unit 3 delivers the correct outputs.

The voting algorithm is performed cyclically, in particular after the time-critical processes in the control units 3 have been executed and completed and respective output information is provided and before the next time-critical processes in the subsequent cycle begins.

One benefit of this cyclic decision for the selection of the one control unit 3 to be used is that there is a clearly defined switchover process, i.e. even in case of a complete failure of the control unit 3 used it is guaranteed that a fully operational control unit 3 may take over control of the physical unit 2 in the next control cycle. This may be acceptable since it can be assumed that the physical unit 2 is capable of tolerating one or a few corrupted outputs.

Furthermore, the control units 3 may be provided with some predefined default value or default signal in case the selected control unit 3 fails. The failure could be complete or physically failure e.g. no signal can be sent anymore and logically failure e.g. control logic failed and thus, default failure value is sent. This default value or signal is then sent to the physical unit 2 in case of failure. In the next execution cycle, the voting unit 6 may detect a failure when recognizing the default value and may consequently select another operational control unit 3, so that the failure of the formerly used control unit 3 is only allowed to affect the control process for a single cycle. Furthermore, if the selected control unit 3 fails completely, the voting unit 6 may detect a failure as no value is received within a pre-defined time period may consequently select another operational control unit 3, so that the complete failure of the formerly used control unit 3 is only allowed to affect the control process for a single cycle.

In addition to the decision of the correct output of the control unit 3 and the selection of the control unit 3 to be used, the voting unit 6 is moreover capable of performing error detection by means of comparing all the outputs of the control units. Thereby, erroneous control units 3 may be detected and marked as incorrect. Depending on the automation system 1 in which the control units 3 are used, an alarm can be triggered notifying an operator about the incorrect state of a found erroneous control unit 3.

The selection of the control unit 3 to be used in the next cycle may be performed based on the following schemes:

The control units 3 can be selected according to a priority scheme, e.g. each control unit 3 has a unit ID reflecting a priority of the control units 3. For selection, the control unit 3 having the highest or lowest ID can be selected according to the priority scheme.

Furthermore, the control unit 3 to be selected can be selected randomly.

It may be further provided that the control unit 3 that has most often been selected as the one used control unit 3 can be selected. This requires that the voting unit 6 is capable of keeping track of the use of the control units 3 and their previous selections, for instance by assigning a counter to the control units 3. This counter is incremented when a control unit 3 is selected to be primary in the next execution cycle. The counter can be implemented in the protected memory 5.

If the automation system does not allow to operate the control units 3 in parallel, but for example in a time-synchronized manner, the one operational control unit 3 should be selected as primary that is scheduled first so as not to introduce additional delay to the control process.

FIG. 2 shows a flow chart which illustrates the method steps to be performed according to the method for controlling a physical unit.

In step S1, a plurality of controlling outputs is generated in a redundant manner in the control units 3. The generation can be performed according to a feed-forward control or a feed-back control.

In a following step S2, one of the controlling outputs which has been previously selected is applied to the physical unit 2. In an initial cycle, a predetermined first of the control units 3 may be selected.

In a following step S3, the voting unit 6 at least checks if the selected controlling output is correct. It can also be provided that a check regarding correctness is performed for all of the controlling outputs.

In a following step S4, the voting unit 6 selects an operational control unit 3 or controlling output thereof checked as correct before and applies a respective selection information to the multiplexer 4 to apply the controlling output of the selected control unit to the physical unit 2 in a succeeding cycle.

After step S4, the process is repeated from step S1.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

REFERENCE LIST 1 automation system
2 physical unit, technical system
3 control unit
4 multiplexer
5 protected memory
6 voting unit

The invention claimed is:

1. A method for controlling a physical unit, the method comprising:
cyclically generating a plurality of controlling outputs, wherein the plurality of controlling outputs is provided in a redundant manner;
applying a selected controlling output of the controlling outputs to the physical unit;
checking if at least the selected controlling output is correct; and
selecting a selected control unit whose controlling output was checked as correct to apply its controlling output to the physical unit in a subsequent cycle,
wherein the applying is performed before the step of checking, and in case the selected control unit has generated an invalid output, the selected control unit is replaced by another control unit before the next controlling cycle.

2. The method of claim 1, wherein the checking is performed as a plurality, majority, or likelihood voting.

3. The method of claim 1, wherein the checking includes checking among all controlling outputs which of the controlling outputs are correct.

4. The method of claim 3, wherein the selecting is performed using:
a priority scheme;
a random scheme; or
a scheme wherein a number of changes of the selected controlling output is minimized.

5. The method of claim 1, wherein, if the controlling outputs are generated successively, the selected controlling output that is checked as correct and is generated first in one cycle is selected.

6. The method of claim 1, wherein, if a predetermined default value is recognized in one or more of the controlling outputs, a respective controlling output is checked as incorrect.

7. An apparatus for selecting one of a number of control units to be used for controlling a physical system, the number of control units redundantly providing controlling outputs, the apparatus comprising:
a voting unit, which is configured:
to allow a previously selected control unit to apply its controlling output, as a previously selected controlling output, to the physical system;
to check if at least the previously selected controlling output is correct;
to select one of the controlling outputs checked as correct;
to provide the controlling output of a selected one of the control units for applying to the physical unit in a subsequent cycle; and
to allow a previously selected controlling output to be applied to the physical system before the next controlling cycle and before it is checked, if the previously selected controlling output is correct.

8. An automation system, comprising:
a plurality of control units configured to generate redundant controlling outputs;
an apparatus for selecting one of the plurality of control units to be used for controlling a physical system, the plurality of control units redundantly providing controlling outputs, the apparatus comprising:
a voting unit, which is configured:
to allow a previously selected control unit to apply its controlling output, as a previously selected controlling output, to the physical system;
to check if at least the previously selected controlling output is correct;
to select one of the controlling outputs checked as correct;
to provide the controlling output of a selected one of the plurality of control units for applying to the physical unit in a subsequent cycle; and
to allow a previously selected controlling output to be applied to the physical system before the next controlling cycle and before it is checked, if the previously selected controlling output is correct; and
the physical system.

9. The automation system of claim 8, further comprising:
a multiplexer configured to select one of the controlling outputs of the control units to be applied to the physical system.

10. The method of claim 1, wherein the checking is performed as a plurality voting.

11. The method of claim 1, wherein the checking is performed as a majority voting.

12. The method of claim 1, wherein the checking is performed as a likelihood voting.

13. The method of claim 2, wherein the checking includes checking among all controlling outputs which of the controlling outputs are correct.

14. The method of claim 4, wherein the selecting is performed using the priority scheme.

15. The method of claim 4, wherein the selecting is performed using the scheme wherein a number of changes of the selected controlling output is minimized.

16. The method of claim 4, wherein the selecting is performed using the random scheme.

* * * * *